2,940,591

MASKING TAPE

Frank Swedish, Jr., Hudson, Wis., William H. O'Brien, South St. Paul, and Lloyd E. Picard, St. Marys Point, Minn., assignors to Minnesota Mining and Manufacturing Company, St. Paul, Minn., a corporation of Delaware No Drawing. Filed Aug. 22, 1958, Ser. No. 756,525

3 Claims. (Cl. 206—59)

This invention relates to a novel type of pressure-sensitive adhesive masking tape wound upon itself in roll form.

A distinguishing feature is that the present tape employs a backing of creped paper which has not been impregnated or treated to unify the fibers as in conventional masking tapes, yet this aggressively tacky tape can readily be unwound from the roll without impairment and removed from surfaces to which temporarily applied. The invention provides a commercially useful two-element paper masking tape consisting only of an unimpregnated creped paper backing coated with a pressure-sensitive adhesive. Thus no paper saturating operation and only one coating operation is required.

Masking tapes, supplied in roll form, have been commercially used on a large scale for many years. The conventional backing is a porous creped paper, similar to absorbent towelling paper, that has been impregnated with a flexible and stretchable composition (such as a rubber-resin blend or an elastomer) which binds the fibers together, so as to unify and strengthen the paper and provide smooth tape edges, and which provides a barrier to lacquer solvents and the like. The back surface is commonly given a thin backsize coating to reduce the force required to unwind the tape and to preclude fiber picking. The front surface is commonly given a primer coating to improve the bonding of the adhesive coating, and is thereafter coated with a pressure-sensitive rubbery-base adhesive. The dry adhesive coating is aggressively tacky in its normal state at normal temperatures, so that the tape strongly adheres to surfaces upon mere finger pressing without need of heating or moistening. Such pressure-sensitive paper-backed masking tapes are widely used in connection with painting operations to mask various surface areas from the applied paint, lacquer, varnish or enamel, and following drying or curing, often involving a baking operation, the tape is stripped off. The tape is designed so that removal does not cause delamination or slivering; the tape being removable intact and without leaving any residue.

In manufacturing such prior masking tapes, it has generally been found necessary to impregnate the preformed creped paper element to an extent which provides a dried impregnant weight in the range of about 50 to 100% of the weight of the untreated paper, i.e., 50 to 100% of the fiber weight. The unified creped papers have been of such nature that the tape product has a stretch value in the range of about 5 to 12% (by which is meant the percent elongation when the tape is pulled by hand until it ruptures). Attempts to substantially increase the stretch value have resulted in undesirable characteristics such as difficulty in easily tearing the tape with the fingers.

The present invention eliminates the need of such unifying impregnants and of backsize and primer coatings. The tape has a novel type of creped paper backing which consists substantially entirely of the paper fibers, so as to be devoid of other components weighing more than 10% of the fiber weight. This new masking tape can readily be torn and has a relatively high-stretch in the range of about 20 to 30% coupled with a lengthwise tensile strength of at least 10 pounds per inch width. Rolls of the present tape have good stability. No gapping or telescoping occurs upon long standing. This novel masking tape provides a satisfactory substitute for more expensive conventional tapes for many usages not requiring performance features peculiar to the latter and with the advantage for some usages of greater stretchiness. The present tape backing has good heat resistance, which is important when the tape is subjected to baking. Surprisingly, it has good resistance to penetration by lacquer solvents and coloring materials contained in paints and lacquers. This tape has utility for purposes other than masking owing to its combination of properties and to its relative cheapness.

The creped paper element is formed on the wet end of a paper-making machine from a highly-beaten semi-glassine stock, preferably using unbleached or semi-bleached Kraft pulp; the fibers having been beaten to a high Williams freeness value of about 200 to 500 seconds. The fiber weight (dry solids basis) is such as to result in a creped paper having a weight in the range of about 100 to 150 pounds per thousand square yards (fiber weight) and a lengthwise tensile strength of at least 10 pounds per inch of width.

A small proportion of fiber sizing agent (synthetic or natural), which is water-insoluble in the paper product, may be incorporated in the beater stock so as to provide a paper initially containing a small proportion of sizing particles distributed on, or trapped between, the fibers. This optional expedient may be advantageously employed to increase the wet-strength and to lower the water-sensitivity of the paper product so as to facilitate both wet-creping and subsequent coating of the dried paper with a water-dispersed pressure-sensitive adhesive. A rubbery polymer latex may be employed to impart greater flexibility and softness to the tape backing.

Examples of suitable wet-strength beater sizing agents are neoprene (rubbery polymer of 2-chloro-1,3-butadiene), Buna-N and Buna-S rubbers, wet-strength resins of the urea-formaldehyde, melamine-formaldehyde and polyester types, sodium silicate and viscose. Neoprene is preferred. Such beater-sizing agents, if used, should be employed in small amount only so as to provide a paper backing containing no more than 10% of additives relative to paper fiber weight on a dry solids basis. Adequate unification of the paper fibers is not dependent upon the incorporation of such sizing agents. The highly-beaten semi-glassine fiber stock employed in making the paper contains fibers whose fibrillation and gelation results in direct fiber-to-fiber bonds in the paper product that produce adequate unification of the structure even in the absence of any fiber-binding or fiber-sizing agent. When limited use is made of beater-sizing agents as indicated above, there is no substantial reduction in the number of direct fiber-to-fiber bonds.

During the paper-making operation, the freshly formed paper is given a creping while still in a wet or damp condition, prior to complete drying on the heated cylinders. Crepe lines are provided in the range of about 20 to 60 per lineal inch. This is of critical importance as excessively coarse or fine creping will not permit of a tape product having the requisite combination of properties.

The dried creped paper is preferably calendered. Calendering is highly advantageous in rendering the backing thinner, denser, smoother, softer (more pliant), more uniform, and in reducing the coating weight of adhesive that is needed to obtain the requisite adhesive bonding strength.

This type of paper product may aptly be designated as a semi-glassine wet-creped paper. The term "wet-creped" is employed herein to designate paper that has been creped during an intermediate stage of paper manufacture while still damp or wet, as distinguished from finished paper that has been rewet and creped. The present paper cannot be creped in the latter manner to obtain a similar or equivalent product, since proper creping to obtain the desired properties must be effected prior to setting of the fiber-to-fiber bonds between the short gelatinous fibers of this semi-glassine paper.

To complete the masking tape sheeting, a pressure-sensitive adhesive solution or dispersion is coated on one side of the creped paper product, preferably on the smoother side. No primer is needed as adequate bonding of the adhesive to the porous paper is obtained. After drying, the coated sheeting is slit and wound into masking tape rolls of desired size. The unitary tape combination of creped paper backing and pressure-sensitive adhesive coating has a "dead-stretch" (as distinguished from a "live-stretch" such as that of rubber bands) and this permits of conformation to curved or irregular surfaces and permits the tape to be applied so as to define a stable curved masking edge when desired. The creped paper has a high stress-strain modulus which permits of manufacturing the tape, and of unwinding the tape from a roll, without impairment or pulling-out of the creping.

The adhesive coating weight (dry solids basis) should not exceed approximately the paper backing weight.

A desirable feature of the present tape construction is that the adhesive may be applied to the unimpregnated creped paper backing in the form of an aqueous dispersion, and this procedure is preferred. The adhesive coating machine may be located at the end of the paper-making machine so as to permit of complete manufacture of the paper-backed adhesive sheeting in one continuous operation and without use of organic solvents at any stage and without any treatment or processing of the paper (other than intermediate wet-creping) being required prior to coating with adhesive. However, priming and/or backsizing may be included if desired.

It is essential for present purposes to employ a low cold-flow pressure-sensitive adhesive, having a high-degree of firmness (shear strength) at normal room temperatures, so as to permit rolls of tape to be readily unwound even after long standing. Many of the adhesives heretofore employed in masking tapes are too soft and consequently have too much cold-flow for present usage.

A suitably firm adhesive can be provided by employing an aqueous dispersion of high-molecular weight rubbery polymer latex and very finely-divided solid tackifier resin, so that upon drying of the coating the rubbery polymer particles and compatible resin particles blend together to produce a rubber-resin type pressure-sensitive adhesive, the proportions being such that the dried adhesive is aggressively tacky. This expedient avoids milling or other degrading of the rubbery polymer such as results in the preparation of many pressure-sensitive adhesive coating compositions. Another expedient is to employ a rubber-resin adhesive solution containing a vulcanizing agent or the like which will firm up the rubbery component of the dried adhesive coating upon suitable heating before or after application to the paper backing. The present manufacturing procedure facilitates the obtaining of a satisfactory adhesive coating in that the paper element is sufficiently porous to permit solvent or moisture of the adjacent adhesive coating to escape therethrough during the drying operation, resulting in a denser dried adhesive coating than is obtainable when an impermeable backing is used.

The requisite low cold-flow property of the tape adhesive is indicated by a shear strength value of at least 100 minutes as determined by the following test procedure:

A polished stainless steel test panel is used having a bottom edge milled to form an angle of 90° with the flat surface of the panel. A tape specimen of ½ inch width by 6 inch length is applied to the surface so that a ½-inch by ½-inch area is in adhesive contact, the tape extending over the bottom edge at right angles thereto, and is pressed down by rolling back and forth once with a rubber-covered roller weighing 4.5 pounds. The test panel is clamped in a vertical position so that the free end of the tape hangs from the bottom edge. This free end is folded over on itself, adhesive side in, to form a loop, and a 1000 gram weight is hung therefrom. The test is performed at normal room temperature. Measurement is made of the time interval between application and falling of the weight, the weight falling when the tape has slipped from the test panel. This time in minutes is the above-mentioned "shear strength value."

*Example 1*

Commercial scale paper mill equipment was employed comprising in connected series a beater, a storage chest, a cylinder type paper machine having an endless wet press felt which picks up the wet fiber layer from the cylinder screen and transfers it to a steel wet press roll. Creping was effected on the wet press roll by means of a suitable thin steel creping blade adapted to impart the desired degree of creping fineness (number of crepe lines per lineal inch). An endless woven cotton belt transferred the wet creped paper into a dryer section of the machine where the paper was dried by passing around a series of rotating heated steel cylinders. The dried creped paper was then passed between calender rolls to reduce the caliper and thence directly through an adhesive coating machine, followed by drying on heated drums and winding into jumbo rolls of dried adhesive sheeting. The adhesive sheeting was subsequently slit and wound into tape rolls of desired width and length.

The following description sets forth the details:

The beater was charged with 210 pounds of semi-bleached kraft pulp (for instance, "Korsnas Manila" pulp sold by Pagel Horton Company) and 800 gallons of water. The beater roll was set down on the bed plate to produce a hard beating which was prolonged for about 1½ hours to produce a Williams freeness value of 450 seconds. The beater roll was then raised and sufficient additional water was mixed in to dilute the paper-making stock to a 2% consistency (2% fiber solids by weight).

A wet-creped paper was produced which, upon drying, had a caliper thickness of 9–10 mils before calendering and 6–8 mils after calendering. It weighed 125 pounds per thousand square yards, had a lengthwise tensile strength of 11 pounds per inch width, a lengthwise stretch of 25%, and an average of approximately 25 crepe lines per lineal inch.

This creped-paper backing was directly fed to an adhesive coater of the air-knife type where it was coated on the smoother side with an aqueous adhesive composition containing a rubbery polymer latex and a finely-divided solid tackifier resin, so as to result in an ultimate dried adhesive coating weight of 108 pounds per thousand square yards. The adhesive had a shear strength (as previously defined) of over 1000 minutes. It will be noted that the adhesive coating weight (dry basis) is somewhat less than the paper backing weight.

The adhesive coating composition was previously prepared as follows:

The solid tackifier resin was a pure hydrocarbon terpene resin melting at approximately 115° C. and having a zero acid number (e.g., "Piccolyte S–115" resin sold by Pennsylvania Industrial Chemical Corp.). It was reduced to a coarse powder by passing through an attrition mill or cereal mill. This powder was then reduced to a very fine particle size by wet grinding in a Szegvari Attritor, consisting of a vertical shaft fitted with a number of horizontal blades or paddles and revolving in a jacketed drum or tub filled with small flint pebbles; this mill having a capacity of 10 gallons and containing 125 pounds of pebbles. In making a run, 31.2 pounds of water was first added to the mill, followed in succession by 2.1 pounds of partially-polymerized rosin (e.g., "Polypale" resin sold by Hercules Powder Co.), 1 pound of 28% ammonium hydroxide, 0.7 pound of antioxidant (e.g., "Santovar A" sold by Monsanto Chemical Co. and believed to be 2,5-di-tertiary amyl hydroquinone), and 35 pounds of the powdered terpene resin. Milling was continued for five hours while cooling water was circulated through the jacket. The batch was then drawn off. It was white and creamy in appearance, and when a thin film was taken on the finger the water evaporated almost immediately to leave a white impalpable powder.

In the above resin-dispersing procedure, the antioxidant is optional and is used to avoid any possibility of oxidative degrading of the resin. The semi-polymerized rosin reacts with the ammonia to form a water-soluble soap serving as a suspending agent. (On ultimate drying of the adhesive coating, the ammonia is liberated so that this soap reverts to water-insoluble rosin which functions as an additional tackifying resin component of the adhesive.)

This aqueous resin dispersion was blended with an aqueous rubber latex dispersion by simple mixing in a paddle-type mixer; using 136 parts of the resin dispersion and a premix of 83 parts of Hevea crude rubber latex (60% rubber solids), 91 parts of high molecular weight rubbery polybutadiene latex (55% rubber solids) (e.g., "Firestone 2004" sold by Firestone Tire & Rubber Co.), and 1.4 parts of the antioxidant mentioned above; resulting in a smooth and homogeneous adhesive coating composition containing approximately 70 parts by weight of tackifier resins per 100 parts of rubber (natural and synthetic) on a dry solids basis.

*Example 2*

The procedure was the same as in the preceding example except for the incorporation of neoprene latex as a beater-sizing agent.

In this case the beater was charged with 835 pounds of the pulp and 2100 gallons of water. After hard beating to a Williams freeness value of 450 seconds, the beater roll was raised away from the bed plate to permit of mixing without further beating. The pulp slurry was diluted with water to a 2½% consistency and the following buffering and stabilizing solution was added to prepare the stock for addition of the sizing latex:

| | |
|---|---|
| Water _____ pounds__ | 20 |
| Soda ash _____ do____ | 1.25 |
| Zinc oxide _____ do____ | 4.5 |
| Stabilizer _____ ounces__ | 6 |
| Antioxidant _____ do____ | 6 |

The stabilizer was a sodium alkyl aryl sulfonate type (e.g., "Darvan #1" sold by R. T. Vanderbilt Co.). The antioxidant was 2,2'-methylene bis-(4-methyl, 6 tert. butyl phenol); (e.g., "Antioxidant 2246" sold by American Cyanamid Co.).

Then 100 pounds of rubbery neoprene latex containing 38% solids (e.g., type 735 neoprene latex sold by Du Pont) was thoroughly mixed with the stock. A 10% aqueous solution of aluminum sulfate was slowly added with gentle mixing in amount sufficient to reduce the pH value approximately 4.5 to precipitate the rubbery latex and zinc oxide particles on the pulp fibers. The sized fibers hold the precipitated solids sufficiently well so that a clear white water is obtained at the paper machine, substantially all of the solids being carried into the paper. The zinc oxide is employed to cure the neoprene and to neutralize any acid liberated by it during aging of the tape product.

The resultant paper-making stock was formed into creped paper and masking tape was manufactured therefrom, in the manner previously described. The paper contained approximately 5% beater-sizing additives relative to the fiber weight (dry solids basis). The neoprene beater-sizing resulted in higher wet-strength and lower water-sensitivity, facilitating both the wet-creping of the paper and the subsequent coating of the dried creped paper with the aqueous adhesive composition. The masking tape product was also rendered somewhat softer and more pliant.

We claim:

1. A pressure-sensitive adhesive masking tape wound upon itself in roll form and consisting of a semi-glassine wet-creped paper backing made from highly-beaten paper fibers and devoid of other components weighing more than 10% of the fiber weight, said paper weighing 100 to 150 pounds per thousand square yards and having 20 to 60 crepe lines per lineal inch, said backing being coated on one side with an aggressively tacky pressure-sensitive adhesive having a shear strength value of at least 100 minutes (as determined by the test procedure herein defined) and a coating weight not exceeding approximately the paper backing weight, such that the adhesive tape has a lengthwise stretch of 20 to 30% and a tensile strength of at least 10 pounds per inch width, and can readily be unwound from the roll without impairment and removed from surfaces to which temporarily applied.

2. A masking tape according to claim 1 wherein said paper contains a wet-strength beater-sizing agent in amount not exceeding 10% of the fiber weight but sufficient to increase the wet-strength of the paper.

3. A masking tape according to claim 2 wherein neoprene is used as a wet-strength beater-sizing agent.

References Cited in the file of this patent
UNITED STATES PATENTS

| | | |
|---|---|---|
| 2,143,911 | Fourness _____ | Jan. 17, 1939 |
| 2,571,340 | Carson _____ | Oct. 16, 1951 |
| 2,613,190 | Feigley _____ | Oct. 7, 1952 |

OTHER REFERENCES

"India Rubber World," pages 221–223 May, 1948.